United States Patent [19]

Aker et al.

[11] Patent Number: 4,783,228

[45] Date of Patent: Nov. 8, 1988

[54] METHOD OF BONDING METAL SKINS TO INTERNAL SUPPORT STRUCTURES

[75] Inventors: Sam C. Aker, Arlington; Pettice M. Phillips, Bedford, both of Tex.

[73] Assignee: Lockheed Corporation, Calabasas, Calif.

[21] Appl. No.: 881,810

[22] Filed: Jul. 3, 1986

[51] Int. Cl.$^4$ .................. B32B 31/06; B32B 31/20; B32B 31/26
[52] U.S. Cl. .................. 156/64; 156/91; 156/228; 156/245; 156/285; 156/286; 156/292; 156/307.7; 156/382; 156/359; 156/497; 156/500; 156/583.3; 156/583.91
[58] Field of Search .............. 156/228, 245, 285, 286, 156/307.7, 292, 382, 583.3, 583.91, 64, 91, 497, 359, 500

[56] References Cited

U.S. PATENT DOCUMENTS

| | | | |
|---|---|---|---|
| 2,477,375 | 7/1949 | Jablonsky | 156/292 |
| 3,025,208 | 3/1962 | Geiger | 156/382 |
| 3,097,982 | 7/1963 | Stoner | 156/292 |
| 3,674,585 | 7/1972 | Windecker | 156/245 |
| 3,736,638 | 6/1973 | Stone | 156/292 |
| 4,095,322 | 6/1978 | Scarpati et al. | 156/245 |
| 4,595,444 | 6/1986 | Legge et al. | 156/285 |

Primary Examiner—Jerome Massie
Attorney, Agent, or Firm—Eric R. Katz

[57] ABSTRACT

Disclosed is a method and apparatus for joining a metal skin to an internal structure comprising forming the metal skin to a permanent desired contour; assembling a lattice of ribs and spars and bonding the lattice to the contoured skin and subsequently forming the completed structure by bonding a pair of skin-superstructure assemblies together. Also disclosed is a diaphram designed to apply pressure to the skin only along structurally supported area of the skin to prevent damage.

8 Claims, 3 Drawing Sheets

METHOD OF BONDING METAL SKINS TO INTERNAL SUPPORT STRUCTURES

TECHNICAL FIELD

This invention generally relates to a method and apparatus for adhesive bonding a metal skin to an internal structure as part of the bond tooling in combination with the precise application of pressure to the skin so that a metal skin may be bonded to an internal metal structure using only plastic adhesive without damage to the skin of the resultant structure.

BACKGROUND ART

Aluminum and aluminum base alloys have become important materials in all engineering fields and all the common methods of joining are applied to aluminum and its alloys. With the exception of bolting and riveting and regardless of the considerable differences between them all common joining methods involve the same fundamental property of adhesion, namely, that of bringing the surfaces to be into sufficiently close contact for the interatomic forces to be effective. In pressure welding, and to a lesser extent in resistance welding, the joints are made entirely between solid phases: in fusion welding, the joints are consummated entirely by liquid phases: in brazing and soldering both solid and liquid metals are involved, while when plastic adhesives are used solid metal is joined by a liquid or semi-liquid organic material.

Aluminum was generally regarded as a difficult metal to join by any means other than mechanical. Recent research, however, has led to a better understanding of the properties of the metal which do and/or do not promote joining aluminum and today the results of the aforesaid research have led to the proliferation of such methods.

The methods used to join aluminum are basically the same as those used to join other metals except that modifications in technique have been used to take into account the effect the properties of aluminum. The properties that work against the joining of aluminum by exactly the same techniques that are used to join other metals are: thermal properties; the oxide film; gas reactions; and metallurgical characteristics. Pure aluminum melts at 659° C. and the alloys melt over a range of from about 530° C. to about 650° C. depending upon their composition. When fusion welding is used experience with a particular alloy is necessary because no color change occurs on heating. Additionally, a considerable heat input is required to raise the mating surfaces of aluminum to its joining temperature because the specific and latent heats of aluminum are high and because the thermal conductivity of aluminum is high and varied. The thermal conductivity of aluminum varies from approximately five times that of mild steel in the case of the pure metal to about three times that of mild steel for the alloys.

Perhaps the single most important factor to be taken into account when making satisfactory aluminum joints is the presence of the oxide film which covers the surface of all aluminum-base materials. The rate of oxidation of aluminum is extremely high and the oxide formed does not melt until temperatures above 2000° C. are reached and it is also insoluble in liquid and solid aluminum. This oxide layer on pure aluminum is sufficiently continuous and tough to prevent metal to metal contact even when the metal melts. Oxide fils on aluminum-base materials are porous and retain significant amounts of substances such as grease, dyes and other compounds with which they may become impregnated. For this reason it is necessary to either remove the oxide film completely before or during the joining operation or to ensure that the surface film is uniform in thickness and characteristics over the surface being joined.

It is well known that liquid aluminum absorbs considerable volumes of hydrogen which is less soluble in the solid metal and solidification of a melt into which much hydrogen has been dissolved during welding will result in a porous and consequently weak joint. Porosity in a weld could also result from the dissolution of water vapor and constituent gases from the welding flame in the molten metal at the point of joining.

Soldering aluminum is not yet as generally practical as are welding and brazing, but it has been successfully used to join aluminum cable sheaths and to fill dents in damaged aluminum car panels. Several methods of soldering have been used in the past. These methods all require a high degree of experience and skill to be successfully practiced. One such method involves rubbing a previously cleaned surface with a hot soldering iron and stick solder to first remove the surface oxide layer and then to tin the surface with melting solder before the surface can reoxidize. The friction or rubbing method as this is called requires skill and experience and must be used in combination with chemical cleaning. Another method known as reaction soldering makes use of the reaction between aluminum and zinc chloride whereby volatile aluminum chloride is produced and zinc is deposited on the aluminum surface to provide a suitable base for subsequent soldering. Another soldering method involves immersing aluminum in a bath of molten solder and using ultrasonic waves transmitted through the molten solder to shatter the oxide film thereby allowing the aluminum to be effectively wet by the solder.

One problem with soldered aluminum joints results from the possibility of solder penetrating the aluminum at its grain boundaries and causing some risk of embrittlement and cracking.

During the past several years synthetic resin adhesives have begun to be used for joining like metals, dissimilar metals and metals to non metals. The aerospace industry has led the way in the development of this method for aluminum. The primary characteristic of a plastics joining process is the wetting of a cleaned surface by a liquid or solid of low melting point followed by curing which changes the liquid to a hard infusable resin which will adhere strongly to the metal. Good adhesion depends upon thorough wetting of the surfaces to be joined by the adhesive. Wetting demands thoroughly cleaned and degreased surfaces but in this process the oxide film serves a useful base for adhesion. Because corrosion of the metal cannot be tolerated the types of plastics acceptable for use as the adhesive are limited. The processes used to bond aluminum are divided into two classes based upon the method of curing, which in both cases, is carried out at elevated temperatures. One class requires the application of appliciable pressure during curing and the other requires only sufficient pressure to hold the surfaces being joined together and in close contact during curing. One such method uses a phenol formaldehyde resin which is either brushed or sprayed onto clean aluminum to wet the metal and a polyvinyl formaldehyde powder is then sprayed onto it to give toughness and strength after curing. After a period of open exposure before increasing temperature and pressure the pressure is increased to about 100 tons per square inch at a temperature of 140° to 150° C. for 15 to 20 minutes. If the temperature is higher the curing time is shorter. In the other class of plastic bonding process an epoxyethane resin is applied to a metal at 100°–120° C. by stroking with a rod or as a powder to cold metal by a flame-spray gun, followed in both cases by an oven cure cycle of one to two hours at approximately 180° C. or for a shorter time at a higher temperature.

In both of the preceding methods surface preparation is important to the formation of a good bond and the existence of a uniform and consistent oxide layer also promotes good bonding. Therefore, after degreasing with both solvent degreasers and alkaline cleaing agents, the metal is treated with a chromic acid-sulfuric acid pickling solution. A chromic acid anodizing process may also be used to prepare the oxide for bonding.

Presssure can be applied either in a suitable press having heated platens or in an autoclave using a rubber blanket. When thin gauge materials are being bonded vacuum bagging techniques can be used to apply pressure.

Plastic bonding has allowed substantial design flexibility in the aerospace industry by providing for the production of smooth surfaces because no mechanical fasteners are required. It has also provided for lighter and stronger structures because stress concentrations which accompany fastener holes are eliminated and load transfer from one structural member to another is less abrupt thereby providing for more favorable stress distribution throughout a structure assembled by plastic bonding. The ability to use plastic bonding techniques to join structural members of aircraft has also reduced the corrosion susceptibility of such structures because the use of such a technique inherently eliminates traps or other unsealed and inaccessible pockets where corrosion could go undetected. Nothwithstanding the obvious advantages of plastic bonding procedures, the ability of such a procedure to be successfully put into practice to produce complex shapes using the methods and apparatus of the prior art would require complex and expensive tooling and a complex and inefficient bagging operation.

DISCLOSURE OF THE INVENTION

Accordingly, it is an object of the present invention to provide cost effective plastic bonding tooling that can be easily and economically used to produce complex aerodynamic shapes.

Another object of the present invention is to provide apparatus capable of employing the internal structural components of a complex assembly as a tool for defining the shape of the assembly during plastic adhesive bonding. Another object of the present invention is to provide apparatus for plastic adhesive bonding a metal skin to an internal structure the use of which only requires the application of pressure along the bond lines to be formed thereby preventing damage to unsupported areas of the skin.

A principal feature of the present invention is the provision of a unique apparatus for the plastic adhesive bonding of a metal skin to an internal structure by subjecting the components of the structure being bonded to selective variations in temperature and pressure. In accordance with the present invention the apparatus for plastic adhesive bonding a metal skin to an internal structure generally comprises a contour means for imparting a desired contour to a metal skin to form a contoured metal skin; a first bonding means for plastic adhesive bonding stiffening members inside the contoured metal skin to form a stiffened skin; an assembly means for assembling a lattice of ribs and spars inside the contour of a stiffened skin; a second bonding means for plastic adhesively bonding the lattice of ribs and spars to the stiffened skin to form a skin superstructure assembly; and a third bonding means for plastic adhesively bonding a pair of skin superstructure assemblies together whereby skin areas not reinforced by internal ribs and spars are subjected to pressures no greater than ambient atmospheric pressure thereby reducing the possibility of pressure induced collapse of the skin.

Another feature of the present invention is the ability to produce a plastic adhesively bonded structure having an aerodynamically smooth skin.

Another important feature of the present invention is the ability to produce a structure having a skin which is plastic adhesive bonded to an internal structure in a manner which reduces the structures susceptibility to the "oil can effect".

Still another feature of the present invention is the ability to plastic adhesive bond a skin to an internal structure by using the internal structure of the body being formed as a consumable tool in the manufacturing process thereby effectively reducing the cost of manufacture by eliminating the expense and complexity of the production tooling.

Yet another feature of the present invention is the ability to selectively pressurize the body during assembly so that pressure is only applied to the skin along bond lines where the skin is supported by the internal structure of the body being produced. In a preferred embodiment of the invention, a segmented bladder is provided to apply pressure along bond lines only.

Yet another feature of the present invention is the ability to apply uniform pressure along bond lines when forming subassemblies from which the final structure is fabricated.

Yet another feature of the present invention is the ability to combine two subassemblies to form the final bonded structure without the necessity of transferring the subassemblies from the tool in which they are assembled.

One advantage of the present invention is the ability to produce aerodynamic structures by a plastic adhesive bonding process without the necessity of using a complex bagging procedure.

Another advantage of the present invention is the ability to produce aerodynamic structures by a plastic adhesive bonding process at a reduced cost of manufacturing such structures.

Another advantage of the present invention is the ability to produce an aerodynamically smooth structure comprising a skin attached to an internal supporting structure.

Still another advantage of the present invention is the ability of the method and apparatus of the present invention to avoid the hazards of bag bridging.

Another important advantage of the present invention is the elimination of the necessity to tailoring a pressure bag to fit into all the various voids and pockets in a subassembly thereby saving significant amounts of manufacturing time.

Still another very important feature of the present invention is the ability to assemble a structure comprising a skin attached to an internal supporting structure from which stress concentrations due to fastener holes are eliminated and load transfer from one structural member to another is less abrupt thereby providing for a structure having an improved stress distribution.

An additional advantage of the present invention is the provision of an end product which is less susceptible to corrosion because unsealed and inaccessible pockets where corrosion can proceed undetected are eliminated.

Still another important advantage of the present invention is the provision of a finished product which weighs less than similar products manufactured by prior art methods.

Another advantage of the present invention is the elimination from wet structures of vibration induced leakage around fasteners.

In accordance with these and other objects, features and advantages of the present invention there is provided an apparatus for plastic adhesive bonding a metal skin to an internal supporting structure by a process which subjects the bonded articles to variations in temperature and pressure which comprises means for imparting a desired contour to a metal skin; a means for plastic adhesively bonding stiffening members inside the contour of the contoured skin; a means for assembling a lattice of ribs and spars inside the stiffened contoured skin and mechanically joining the ribs and spars; a means for plastic adhesively bonding the rib and spars assembly to contoured skin; and a means for joining a pair of skin-rib-spar assemblies by plastic adhesion bonding in which skin areas not directly reinforced by internal ribs and spars are subjected to pressures no greater than ambient atmospheric pressure thereby reducing the likelihood of a pressure induced collapse of the skin.

Also, in accordance with the present invention there is provided a method of plastic adhesive bonding a metal skin to an internal structure comprising the steps of: providing a pair of metal skin panels, providing means for forming the metal skin panels so that each skin panel assumes and retains a desired contour and forming the skin panels having the desired contour; assembling a lattice of ribs and spars inside each contoured skin panel and bonding rib-spar lattices to the inner surface of the contoured skin panels; and joining the rib-spar-skin assemblies by a plastic adhesive bonding process by applying temperature and pressure to a mated pair of such assemblies in a way which causes pressure to only be applied to the skin along lines directly supported by ribs and spars.

In accordance with the present invention the method of bonding a metal skin to an internal structure further comprises the steps of providing stiffening members for affixing to the contoured skin panels to become somewhat rigid and hold the contour which had been imposed on it; combining the stiffeners and the skin panel in a means for forming contoured panels and adhesively bonding the stiffening members to the skin with an adhesive resin using temperature and pressure to cure the adhesive.

In accordance with the present invention the method of bonding a metal skin to an internal structure comprises the additional step of mechanically joining ribs and spars to form a rib and spar subassembly prior to the step of bonding the ribs and spars to the inside of the skin.

In accordance with the present invention the step of bonding the ribs and spars to the inner surface of the contoured skin with an adhesive resin comprises applying an adhesive resin to a portion of the inner surface of the contoured skin, positioning the rib and spar lattice over the adhesive coated area of the contoured skin; filling the spaces between the contoured skin and the rib and spar lattice to the top of the lattice with a heat and pressure transmitting medium; enclosing the filled assembly in a vacuum bag and evacuating the vacuum bag while raising the temperature of the total system to a curing temperature so that the proper temperature and pressure conditions are maintained for a time sufficient to bond the lattice to the contoured skin.

These and other objects, features and advantages of the present invention will become more readily apparent with a reading of the following more detailed description of the preferred embodiment in conjunction with the accompanying drawings and claims. The drawings in which like reference characters indicate corresponding parts in all views are not necessarily to scale, emphasis instead being placed on illustrating the principles of the invention.

BEST MODE OF CARRYING OUT THE INVENTION

Figure 1:
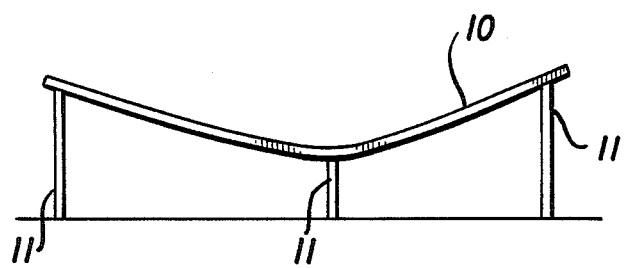
FIG. 1 shows a cross-section of a contoured skin panel.
Figure 3:
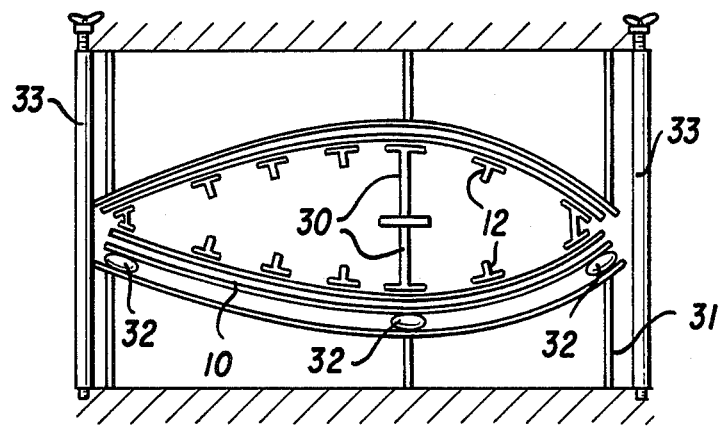
FIG. 3 is a cross-sectional view of the means for joining a pair of skin-superstructure assemblies.
Figure 2:
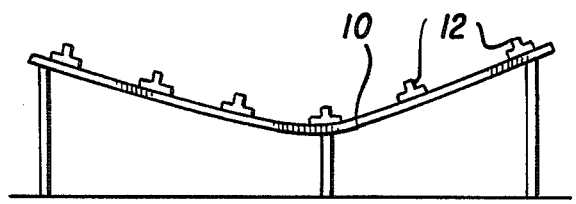
FIG. 2 shows a cross-section of a contoured skin panel having stiffening members bonded thereto.

Referring now to FIG. 1, which shows a skin panel 10 without stiffening members being shaped to a desired contour in contour forming means 11. FIG. 2 shows skin panel 10 in contour forming means 11 with stiffening members 12 bonded to the inner surface of the contoured skin panel 10. FIG. 3 shows a pair of skin-superstructure assemblies 30 being joined in a means for applying temperature and pressure 31 so that pressure is applied only along bond lines thereby preventing damage to the skin 10 due to crumpling or bending as would happen if pressure were to be applied to unsupported areas of skin 10. Means for applying temperature and pressure 31 comprises a pair of contour forming means 11, bladders 32 and fastening means 33 which cooperate to bring the mating surfaces of the skin-superstructure assemblies 30 into contact under the proper conditions of time, temperature and pressure to promote cure of an adhesive which has been applied to the mating surfaces and to cause the pair of subassemblies to be bonded together.

Figure 4:
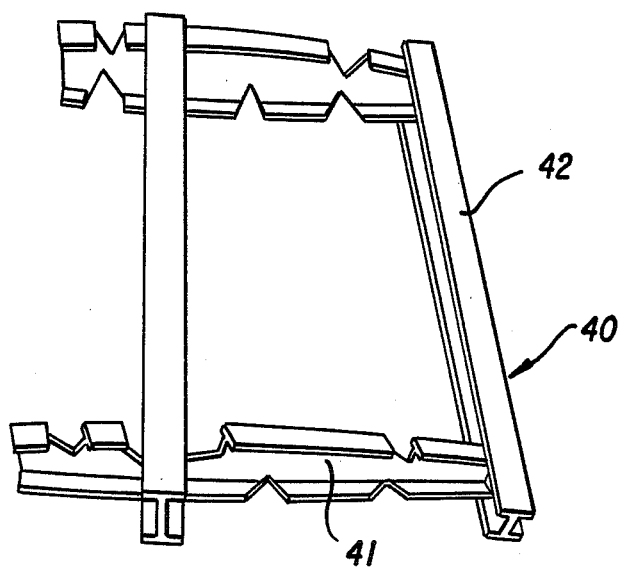
FIG. 4 is stylized representation of a rib and spar subassembly.
Figure 5:
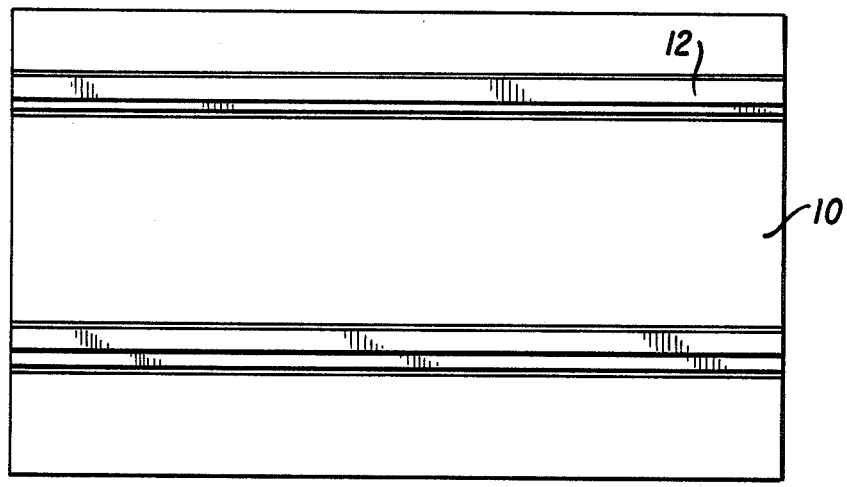
FIG. 5 is a stylized representation of skin panel having stiffening members affixed thereto.
Figure 6:
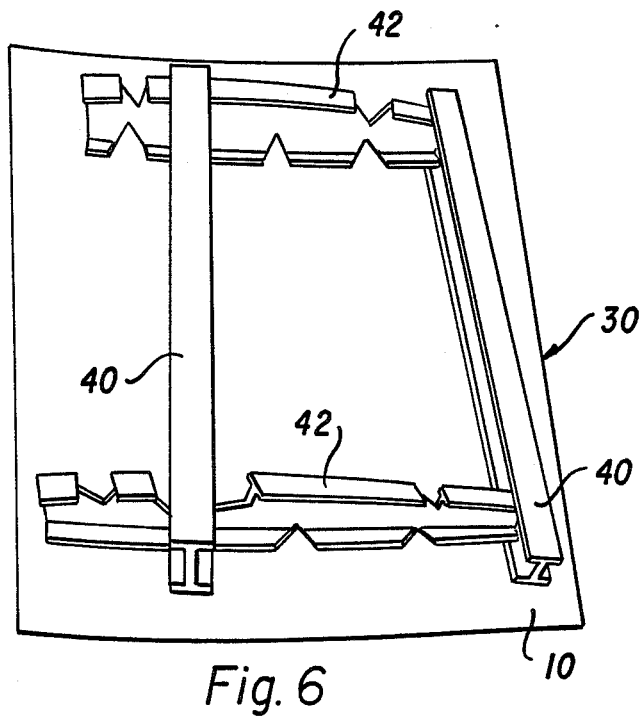
FIG. 6 is a pictorial representation of a skin-superstructure assembly.
Figure 7:
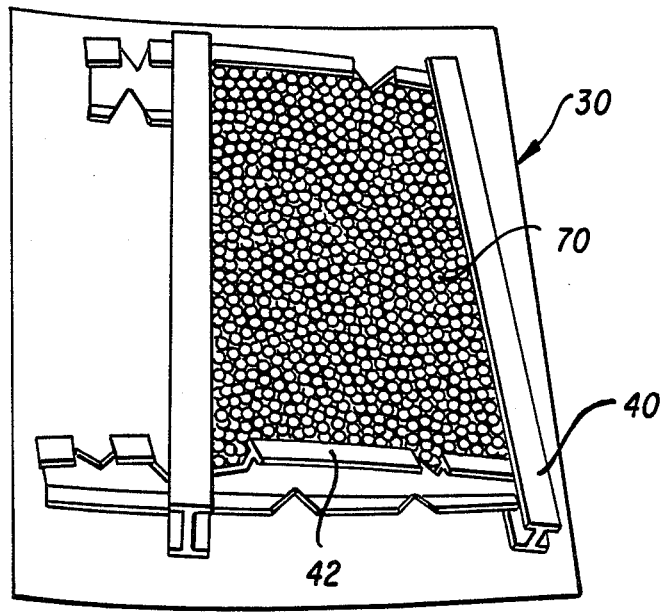
FIG. 7 is a pictorial representation of a skin-superstructure assembly with the heat and pressure transmitting medium in place.

Shown in FIG. 4 is a rib and spar lattice 40 which comprises ribs 41 and spars 42 which are mechanically joined before being attached to a stiffened skin panel 10, FIG. 5, by a plastic adhesive bonding process to form a skin-superstructure assembly 30 shown in FIG. 6. To bond rib-spar lattice 40 to skin 10 the lattice 40 is positioned on skin 10 and a plastic resin adhesive is placed between lattice 40 and skin 10 and the cavity formed between the skin 10 and lattice 40 is filled with a pressure transmitting medium 70 such as glass or metal balls and the entire assembly is enclosed in a vacuum bag and placed in an oven or autoclave so that the volume inside the vacuum bag may be evacuated thereby causing a pressure to be applied to skin 10 and lattice 40 thereby compressing the subassemblies being bonded together to form a firm bond when the resin adhesive is cured by exposure to the elevated temperatures of the oven or autoclave. The advantage of using balls as the pressure transmitting medium 70 is that the balls will conform almost exactly to the shape of the cavity and behave as a fluid pressure transmitting medium which will not leak as is common with pressurized air bags. The ability of balls to conform to the shape of the cavity eliminates the need to tailor and intricately shape a bag to fit the numerous pockets formed by the intersecting ribs 42 and spars 40. In production operation the balls 70 can be loaded in and out of the bond fixture with a pneumatic conveying system thereby providing for automated transfer of the pressure medium to and from a central storage facility. When a solid pressure transmitting medium such as metal or ceramic balls is used, thin detailed parts and areas exposed to adhesive flush mount must be covered to prevent surface marring caused by direct contact with the balls and also to prevent the balls from becoming bonded to the structure.

In order to bond the elements of a structure together by a plastic adhesive resin bonding process, the adhering surfaces of the parts to be bonded should first be prepared using a technique such as phosphoric acid anodizing. This procedure produces a stable, inspectable and verifiable surface on aluminum. The anodized surface should then be treated with a heat curing corrosion inhibiting adhesive primer which in combination with a phosphoric acid anodizing of the adhering surfaces produces a stable, storable surface with exceptional environmental durability and predictable bondability. The application of a baked-on primer is essential because parts should have a shelf life of several months so that scheduling flexibility is necessary when a complex structure such as an aircraft wing is being assembled from numerous sub-parts. In actual practice a thin layer film is cured to the mating surfaces of parts to be bonded together. This ahhesive film layer is then covered with a protective medium such as the material known in the industry as pul-ply and a caul sheet. When the part is ready for bonding the pul-ply and caul sheet are removed exposing a fresh bondable surface. All surfaces of the parts were coated with corrosion inhibiting primer and baked at 225° F. This primed surface outside the bond area then becomes the first coat of primer corrosion inhibitor applied to the interior surfaces of a structure such as a wing. Prior to mating of both halves of an assembly each receives a coat of corrosion resistant epoxy polyamide finish to provide the maximum corrosion protection for the internal surface.

FIG. 3 shows in cross-section the final bonding operation wherein two skin-superstructures 30 are joined by plastic adhesive bonding by using two such superstructures to bring the mating surfaces together and holding the two skin-superstructure assemblies 30 together while the rib or lattice functions as an inexpensive functional tool to promote rapid filling thereafter. The preferred method of bonding the skin-superstructure assembly and the second of the two skin assemblies during the mating process includes raising the pressure along the lines of contact between the contoured skin panel and the superstructure so that both bodies are held firmly together and the adhesive between the bodies is evenly distributed. Also, a temperature sensitive device, such as a thermocouple or a series of thermocouples may be utilized to continuously measure the temperature of the contoured skin panel, of the stiffening members and of the adhesive layers, and then evaluating the results of the sensing device and adjusting the curing temperature in accordance with how these results conform to a standard.

Although the present invention has been described and discussed with primary emphasis on one preferred embodiment, it should be obvious that adaptations and modifications can be made thereto without departing from the spirit and scope of the invention.

We claim:

1. A method of adhesive bonding a metal skin to an internal structure comprising the steps of:
    (a) providing a pair of metal skin panels;
    (b) providing means for forming said metal skin panels whereby said skin panels assume and retain a specific contour;
    (c) forming a pair of contoured skin panels;
    (d) assembling a lattice of discrete ribs and spars to form a rib and spar subassembly inside one of said contoured skin panels so that said rib and spar subassembly contacts the inner surface of said contoured skin panel;
    (e) bonding said rib and spar subassembly to the inner surface of said contoured skin panel to form a skin-superstructure assembly;
    (f) assembling a pair of said skin-superstructure assemblies; and
    (g) bonding said skin-superstructure assemblies together by applying temperature and pressure thereto so that pressure is only applied to said skin-superstructure assemblies along the line of contact between said skin-superstructure assemblies.

2. The method of adhesive bonding a metal skin to an internal structure of claim 1 wherein the step of forming a pair of contoured skin panels comprises the steps of:
    (a) providing stiffening members for stiffening said skin panels;
    (b) combining said skin panels and said stiffening members in said means for forming said contoured panels so that the stiffening members contact the inner surface of the contoured skin panels;
    (c) applying an adhesive to the inner surface of the contoured skin panel and to one surface of said stiffening members and replacing the stiffening on the inner surface of said skin panel so that the adhesive layers formed thereby are in contact;
    (d) enclosing the assembled contoured skin panel and stiffening members in a vacuum bag and reducing the pressure therein while increasing the temperature of the contoured skin panel and stiffening member panel so that the adhesive layers bond the stiffening members to said skin panel.

3. The method of claim 1, wherein the step of assembling a lattice of ribs and spars to form a rib and spar subassembly inside one of said contoured skin panels comprises the additional step of mechanically joining said ribs and spars after said rib and spar subassembly is fitted to the contoured skin assembly.

4. The method of claim 1, wherein the step of bonding said rib and spar subassembly to the inner surface of said contoured skin panel to form a skin-superstructure assembly comprises the steps of:
 (a) applying an adhesive to the inner surface of the contoured skin assembly;
 (b) fill all voids in the lattice of ribs and spars up to the top of the ribs and spars forming said lattice with a heat and pressure transmitting medium;
 (c) enclosing the combined rib and spar and contoured skin assembly thus filled with heat and pressure transmitting medium in a vacuum means; and
 (d) evacuating said vacuum means and raising the temperature of the enclosed assembly to a curing temperature for a time sufficient to allow complete curing of said adhesive whereby said rib and spar subassembly is bonded to said contoured skin assembly to form a skin super-structure assembly.

5. The method of claim 4, wherein the step of assembling said skin-superstructure assembly and the second of said contoured skin panels comprises the steps of:
 (a) removing said pressure and heat transmitting medium from the voids formed between the lattice of ribs and spars;
 (b) applying an adhesive to the surfaces of the rib and spar lattice of the skin-superstructure assembly which will contact the second of said contoured skin panels;
 (c) positioning said second contoured skin assembly on the rib and spar lattice of the skin superstructure assembly; and
 (d) enclosing the unbonded assembly in a means for applying pressure only to that portion of said second contoured skin panel which contacts and which is to be bonded to said rib and spar lattice whereby unsupported skin areas receive no pressure above ambient atmospheric and wrinkles or bends in said skin are prevented.

6. The method of claim 1, wherein the step of bonding said skin-superstructure assembly and the second contoured skin assembly comprises the steps of:
 (a) raising the pressure along the line of contact between said contoured skin panel and said skin-superstructure whereby both bodies are held firmly together and the adhesive between said bodies is evenly distributed; and
 (b) increasing the temperature to a curing temperature for sufficient time to bond said second contoured skin assembly to said skin-superstructure assembly.

7. The method of claim 1, further including the steps of continuously measuring the temperature of the contoured skin panel, the stiffening members and the adhesive layers and evaluating the results of said temperature measurements and adjusting the curing temperature in accordance with the results obtained.

8. The method of claim 4, further including the steps of continuously measuring the temperatures of the spar and rib subassembly, the contoured skin panel and the adhesive layer, evaluating the results of said temperature measurements and adjusting the curing temperature in accordance with the results obtained.

* * * * *